United States Patent [19]

Harkness et al.

[11] Patent Number: 4,612,175

[45] Date of Patent: Sep. 16, 1986

[54] FLUE GAS DESULFURIZATION/DENITRIFICATION USING METAL-CHELATE ADDITIVES

[75] Inventors: John B. L. Harkness, Naperville; Richard D. Doctor, Glen Ellyn; Ronald J. Wingender, Deerfield, all of Ill.

[73] Assignee: The United States of America as represented by the United States Department of Energy, Washington, D.C.

[21] Appl. No.: 762,366

[22] Filed: Aug. 5, 1985

[51] Int. Cl.$^4$ ............... A47B 43/00; A47B 48/00; C01B 17/00; C01B 21/00
[52] U.S. Cl. ............... 423/235; 423/243; 556/133; 556/148
[58] Field of Search ............... 423/243, 235; 556/148, 556/133

[56] References Cited

U.S. PATENT DOCUMENTS

| | | | |
|---|---|---|---|
| 3,681,416 | 8/1972 | Miller et al. | 556/148 |
| 4,079,118 | 3/1978 | Gorgi | 423/235 |
| 4,222,991 | 9/1980 | Hass | 423/235 |
| 4,331,639 | 5/1982 | Hass et al. | 423/243 |

OTHER PUBLICATIONS

"Removal of Nitrogen Oxides with Aqueous Solutions of Inorganic & Organic Reagents", H. Kobayashi et al., pp. 190–192, Feb. 1977.
"Absorption of Dilute Nitric Monoxide in Aqueous Solutions of Fe(II)EDTA and Mixed Solutions of Fe(II)EDTA and Na$_2$SO$_3$", M. Teramoto et al., Jun. 1978.
"Identification of Species in a Wet Flue Gas Desulfurization and Denitrification System by Laser Raman Spectroscopy", D. Littlejohn et al., May 1984.
"Effects of Metal Chelates on Wet Flue Gas Scrubbing Chemistry", S. Chang et al., pp. 649–653, Nov. 1983.
"Reduction of Oxides of Nitrogen in Vent Gases", H. R. L. Streight, Feb. 1958.
"Absorption of Nitrogen Oxides into Water", H. Komiyam et al., pp. 154–161, 1980.
*Advanced Inorganic Chemistry*, F. A. Cotton et al., p. 712, 1962.
"Flue Gas Desulfurization", L. Brewer (ed.), p. 146, Nov. 1980.
"Sulfur Dioxide Transport Through Aqueous Solutions: Part 1., Theory", D. L. Roberts et al., pp. 593–610, Jul. 1980.
"Kinetics of the Formation of Hydroxylamine Disulfonate by Reaction of Nitrite with Sulfites", S. B. Oblath et al., pp. 1017–1021, Aug. 1981.

*Primary Examiner*—John Doll
*Assistant Examiner*—Lori S. Freeman
*Attorney, Agent, or Firm*—James W. Weinberger; Arthur A. Churm; Judson R. Hightower

[57] ABSTRACT

A method of simultaneously removing SO$_2$ and NO from oxygen-containing flue gases resulting from the combustion of carbonaceous material by contacting the flue gas with an aqueous scrubber solution containing an aqueous sulfur dioxide sorbent and an active metal chelating agent which promotes a reaction between dissolved SO$_2$ and dissolved NO to form hydroxylamine N-sulfonates. The hydroxylamine sulfonates are then separated from the scrubber solution which is recycled.

20 Claims, 3 Drawing Figures

FLUE GAS DESULFURIZATION/DENITRIFICATION USING METAL-CHELATE ADDITIVES

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

The invention relates to an improved method for the simultaneous removal of $SO_2$ and NO from flue gases.

Typically, flue gases resulting from the combustion of carbonaceous material in power plants contain hundreds to thousands of parts per million (ppm) of $SO_2$ and several hundred ppm of $NO_x$, mostly in the form of NO.

Removal of the sulfur dioxide from flue gas can be accomplished by wet scrubbing. By this method, the flue gas is passed through an aqueous slurry of lime or limestone which reacts with the $SO_2$ to form insoluble $CaSO_4$ and $CaSO_3$ species. In a variation, known as the dual alkali method, the flue gas is passed through a scrubber solution containing 0.05 to 1.5 gm moles per liter of an aqueous sulfur dioxide absorbant such as sodium carbonate which reacts with the $S_2$ in solution to form $NaHSO_3$. The scrubber solution is regenerated by contact with a lime or limestone slurry where the $NaHSO_3$ reacts with the calcium forming the insoluble hydrated $CaSO_3$ and $CaSO_4$ species which are separated and sent to landfill while the regenerated sorbent solution is recycled back to the scrubber.

For some time attempts have been made to find a process, compatable with wet flue gas scrubbing, which will also remove NO from the flue gas. Teramoto et al reported in the *Journal of Chemical Engineering of Japan*, Vol. 11, No. 6 (1978) on the use of ferrous ethylenediaminetetaacetic acid, hereinafter Fe(II)EDTA, to absorb NO into an aqueous solution. While it was hypothesized that sulfur dioxide participated in the removal of NO, the mechanism proposed did not identify the NO and $SO_2$ reaction products and failed to appreciate the significance of the bisulfite ion in promoting the NO removal. Furthermore, these investigators did not operate with oxygen and other major flue gas components in their experimental system which have a major impact on the actual removal of NO from flue gas.

Additional work in the United States on the use of metal chelates such as Fe(II)EDTA on wet flue gas scrubbing has been reported by Chang in *Environmental Science Technology* Vol. 17, No. 11, 1983. This work also indicated that the metal chelates might be effective in the simultaneous removal of $SO_2$ and NO from gas streams, however once again the work was done under oxygen-free conditions.

Flue gases generally contain $O_2$ and, prior to this work, investigations into the use of scrubber solutions containing Fe(II)EDTA for removing NO from flue gas streams have shown that the presence of oxygen in the flue gas quickly decreased the removal efficiency of the scrubber solution from about 80 to about 20% of the NO present in the stream.

We have developed an improved method for the simultaneous removal of $SO_2$ and NO from flue gases which is compatable with present wet flue gas desulfurization methods. Furthermore, we have developed a denitrification process, that operates in conjunction with the desulfurization processes by utilizing metal chelates for removing NO from flue gases which also contain oxygen.

SUMMARY OF THE INVENTION

The invention is an improved method for simultaneously removing $SO_2$ and NO from flue gas streams normally containing oxygen, resulting from the combustion of carbonaceous material, by preparing an aqueous scrubber solution containing an aqueous sulfur dioxide sorbent and an active metal chelate, the active metal chelate being prepared by mixing a soluble metal salt and a chelating agent in an oxygen-free environment for a period of time sufficient for all the possible coordination sites on the chelating agent to coordinate with the metal ion, contacting the oxygen-containing flue gas with the scrubber solution while maintaining the pH of the scrubber solution between 5 and 9, the $SO_2$ dissolving in the solution to form $HSO_3^-$, the NO dissolving in the solution to form $HNO_2$ and $HNO_3$, and some of the $HSO_3^-$ reacting with the $HNO_2$ to form hydroxylamine N-sulfonates, primarily hydroxylamine disulfonate (HADS), thereby removing the $SO_2$ and NO from the flue gas. The hydroxylamine N-sulfonates may then be removed from the solution and the scrubber solution recycled.

The removal of NO from oxygen-containing flue gas can be further enhanced by the addition of a second active metal chelating agent. Specifically, we have found that the addition of citric acid and aluminum sulfate to the scrubber solution containing the active metal chelate will increase the removal of NO to greater than 95%.

It is therefore one object of the invention to provide an improved method for the simultaneous removal of $SO_2$ and NO from gaseous streams.

It is another object of the invention to provide an improved method for the simultaneous removal of $SO_2$ and NO from gaseous streams containing oxygen.

It is still another object of the invention to provide a method for the simultaneous removal of $SO_2$ and NO from flue gas streams containing oxygen resulting from the combustion of carbonaceous material.

It is a further object of the invention to provide a method for the simultaneous removal of $SO_2$ and NO from flue gas streams containing oxygen which utilizes metal chelates.

It is still a further object of the invention to provide a method for the simultaneous removal of $SO_2$ and NO from flue gas streams containing oxygen in which the final products can be disposed of in a safe and permanent manner.

Finally it is the object of the invention to provide active metal chelates and a method for making active metal chelates which are not affected by the presence of oxygen.

DETAILED DESCRIPTION OF THE INVENTION

Figure 1:
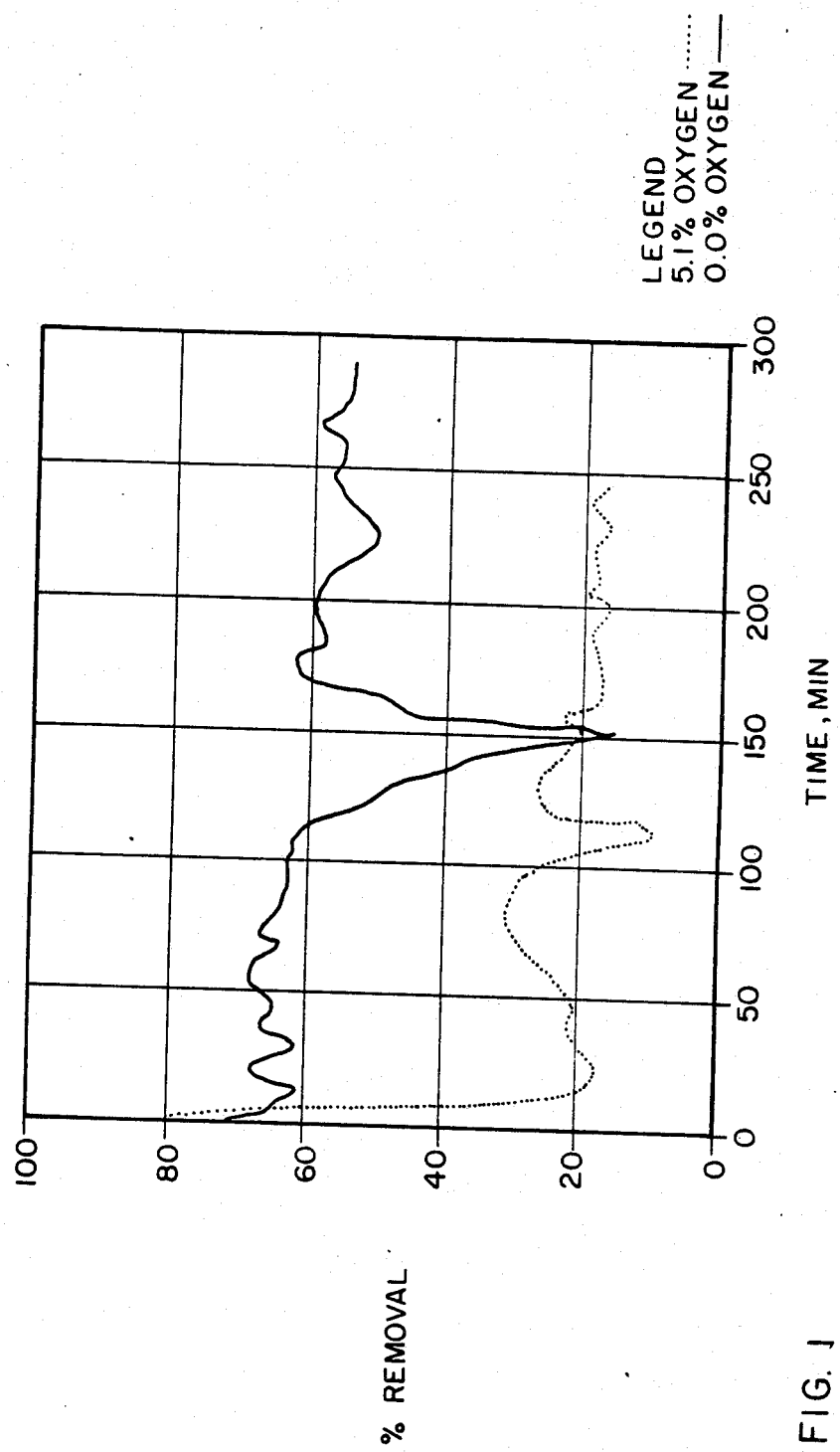
FIG. 1 shows the effect of the presence and absence of $O_2$ on NO removal from flue gas using a solution containing Fe(II)EDTA as prepared by the prior art method.

These and other objects of the invention for removing $SO_2$ and NO from a flue gas containing oxygen may be met by preparing a scrubber solution containing about 0.7 gm moles/liter sodium carbonate ($Na_2CO_3$) as an aqueous sulfur dioxide sorbent and about 0.066 gm moles/l of active ferrous ethylenediaminetetraacetic acid (Fe(II)EDTA), as a metal chelating agent, the active Fe(II)EDTA being prepared by mixing approximately stoichiometric quantities of ferrous sulfate ($FeSO_4.7H_2O$) and the disodium salt of ethylenediaminetetaacetic acid (EDTA) in oxygen-free water under an oxygen-free atmosphere to form a mixture, and stirring the mixture for at least 4 hours until all available sites on the chelating agent are coordinated with the metal ion to form the active Fe(II)EDTA, contacting the oxygen containing flue gas containing at least 3000 ppm $SO_2$ with the scrubber solution while maintaining the pH of the solution from about 6.8 to 7.1, the $SO_2$ dissolving in the solution to form $HSO_3^-$ and the NO dissolving in the solution to form $HNO_2$ and $HNO_3$, whereby $HNO_2$ and $HSO_3^-$ react to form hydroxylaminedisulfonate ($(HO_3S)_2NOH$), removing the hydroxylaminedisulfonate from the scrubber solution, and recycling the scrubber solution, thereby removing the $SO_2$ and NO from the flue gas. The remainder of the $SO_2$ is removed by reacting the dissolved sulfites and sulfates with calcium ions from either lime or limestone.

The method of the invention, using the active metal chelating agent, will remove at least about 70% of the NO from flue gas, and better than about 95% of the $SO_2$ in the flue gas, and is unaffected by the presence of oxygen.

Furthermore, it has been found that the addition to the scrubber solution of about 0.066 gm moles/liter of citric acid and about 0.066 gm moles/liter of aluminum sulfate ($Al_2(SO_4)_3$) as a second active metal chelating agent will further increase the removal of NO from the flue gas to about 95% or greater.

In the double-alkali system, the hydroxylamine N-sulfonates and the dissolved $SO_2$ remaining in the scrubber solution can be removed by contacting the solution with a slurry of lime or limestone. The dissolved sulfites and sulfates react with the calcium to form insoluble calcium sulfate and sulfite species while the hydroxylamine sulfonates precipitate out on the surface of the solids. The regenerated scrubber solution can then be recycled. In the lime and limestone FGD systems, this same process goes on in the settling and reaction tanks.

The aqueous scrubber solution may contain from about 0.05 to 1.5, preferably about 0.7 gm moles per liter of a sulfur dioxide sorbent. When $SO_2$ enters the aqueous phase, it principally reacts with $H_2O$ to form $HSO_3^-$ and $HSO_4^-$ and lesser amounts of other sulfur species. The sorbent is present to promote dissolution of $SO_2$ to form $HSO_3^-$ and to increase its concentration in the solution. Suitable sorbents include sodium carbonate, calcium hydroxide, magnesium oxide and sodium bisulfite. While the method of the invention is preferably used with the dual alkali scrubber system as hereinbefore described, it may also be used with the lime or limestone slurry scrubber systems by adding the $SO_2$ sorbent and active metal chelate to the slurry. NO removal with the slurry system may not be as effective because of the difficulty of maintaining high $HSO_3^-$ concentrations in solution because of its reactivity with calcium ion, removing it from solution.

Suitable chelating agents are the polyamines such as hexamethylenetetraamine (HMTA), ethylenediamine, diethylenetriamine, triethylenetetraamine, polyaminopolycarboxylic acids, such as ethylenediaminetetraacetic acid (EDTA) and N-(2-hydroxyethyl)ethylenediamine-N, N', N'-triacetic acid (HEEDTA) and polycarboxylic acids such as citric acid. Suitable metal ions include Fe(II), Zn(II), Ni(II) and Co(II) and Al(III). The quantity of active metal chelate in the solution may range from about 0.01 to 0.7 gm moles per liter, preferably the range is 0.06 to 0.075, about 0.066 gm moles/liter. The scrubber solution typically may contain more than one chelating agent in the concentration described above since it has been found that the addition of a second agent may enhance removal of NO from the flue gas to greater than 95%.

The active metal chelate is prepared by mixing an appropriate quantity of metal as a soluble salt with the soluble chelate in deoxygenated water and stirring the mixture for a period of time sufficient for all the possible coordination sites on the chelating agent to coordinate with the metal ion. While the exact period of time is not specifically known, it is believed that at least 3 to 4 hours should be sufficient to prepare the active metal chelate. In the laboratory, the mixture was stirred overnight under a blanket of nitrogen to prepare the active metal chelate.

It is presumed that when prepared in an oxygen-free environment, the extent of chelation is such as to decrease or eliminate the possibility of formation of the metal hydroxide as well as to form a metal species more resistant to oxidation to a higher oxidation state (in the case of iron this is the conversion Fe(II)→Fe(III)).

The addition of other organic ligands to the scrubber solution have been found to greatly enhance the removal of NO from the flue gas. Suitable ligands include the organic acids which may act also as anti-oxidants such as citric acid, asorbic acid and salicylic acid. The concentration may vary from about 0.05 to 2.0 gm moles/liter, preferably 0.06 to 0.075, typically about 0.066 gm moles/liter.

The pH of the scrubber solution must be maintained in the range of 5 to 9, preferably 6.75 to 7.25, and optimally 6.8 to 7.1. This is necessary to maintain a high concentration of $HSO_3^-$ ion in the solution. Scrubber solutions having pH ranges above or below those indicated will not contain sufficient $HSO_3^-$ ions to effect the removal of NO from the flue gas. The pH can be readily maintained by monitoring the scrubber solution and adding more aqueous sulfur dioxide sorbent as necessary.

The operation temperature of the scrubber solution may vary from about 25° to 75° C., but is typically maintained at about 50° C.

It is important that the carbonaceous product undergoing combustion contain a relatively high percentage of sulfur so that the flue gas will contain at least 1000 ppm, preferably 3000 ppm, of $SO_2$ and that the flue gas contain at least twice, preferably six times the $SO_2$ molar concentration compared to that of the NO content of the flue gas. This is necessary in order that the $HSO_3^-$ concentration of the scrubber solution is sufficient to react with the $HNO_2$ in the scrubber solution to form the hydroxylamine N-sulfonates. This ratio of $HSO_3^-$ to $HNO_2$ in solution must be at least 2:1, preferably at least 4:1 and most preferably 6:1 to insure complete and rapid reaction of the $HNO_2$.

The method of the invention presents an integrated mechanism involving the simultaneous removal of NO and $SO_2$ which occurs during the system's operation in the pH range of 5 to 9. The metal chelates promote NO removal, as a result of the co-scrubbing of NO, $NO_2$, and $SO_2$ as nitrous acid and sulfurous acid to form hydroxylamine N-sulfonates (HANS) in the following manner.

$SO_2$ aqueous absorption will be controlled by the following system of reactions:

$$SO_2 + H_2O \longrightarrow H_2SO_3 \xrightarrow{H_2O} H^+ + HSO_3^-$$

Sulfurous acid with a $pKa_2 = 6.9$ will exist predominantly as bisulfite ion $(HSO_3)^-$ *in solution.*

The presence of the metal chelates to which NO is bound by a nitrosyl-metal bond are thought to serve as an intermediate species in the formation of nitrous acid:

$$NO^+ + H_2O \rightarrow H^+ + HNO_2$$

$$2NO_2 + H_2O \rightarrow HNO_2 + HNO_3$$

$$NO + NO_2 + H_2O \rightarrow 2HNO_2$$

The nitrous acid then reacts with the bisulfite to form hydroxylamine disulfonate as well as other sulfonates:

$$HNO_2 + HSO_3^- \rightarrow NOSO_3^- + H_2O$$

$$NOSO_3^- + HSO_3^- \rightarrow HON(SO_3)_2^{-2}$$
(Hydroxylamine disulfonate-HADS)

The HADS formed will remain in the aqueous phase and build up to a level where it will be removed with the scrubber sludge.

The method of the invention is advantageous over other methods for $NO_x$ removal because it is readily compatable with the wet scrubber methods presently in use for $SO_2$ removal from flue gases.

The following Examples are given to illustrate the method of the invention and are not to be taken as limiting the scope of the invention which is defined in the appended claims.

EXAMPLE I

In order to study the effect of the presence of oxygen in a flue gas, a scrubber solution was prepared which contain 0.067 gas moles of Fe(II)EDTA prepared by mixing 66.72 gm of ferrous sulfate with 89.79 gm of $Na_2H_2EDTA$ in distilled water. Sufficient sodium carbonate was added so that the solution contained 0.31 gm moles/liter of sulfur dioxide sorbent. The solution was heated to about 50° C. and a synthetic flue gas having the composition: 3000 ppm $SO_2$, 50 ppm $NO_2$, 450 ppm NO, 14.5% $CO_2$ with the balance $N_2$ was passed through the solution for 5 hours while monitoring the exiting gas for determination of NO removal. In a similar manner, a second synthetic flue gas containing 5.1% oxygen was passed through a similar solution. The results of both tests are given in FIG. 1. Note that the efficiency of NO removal immediately drops to about 20% in the presence of oxygen in the flue gas. The further drop in NO removal in each run caused by a decreased $HSO_3^-$ ion concentration in the scrubber solution.

EXAMPLE II

Figure 2:
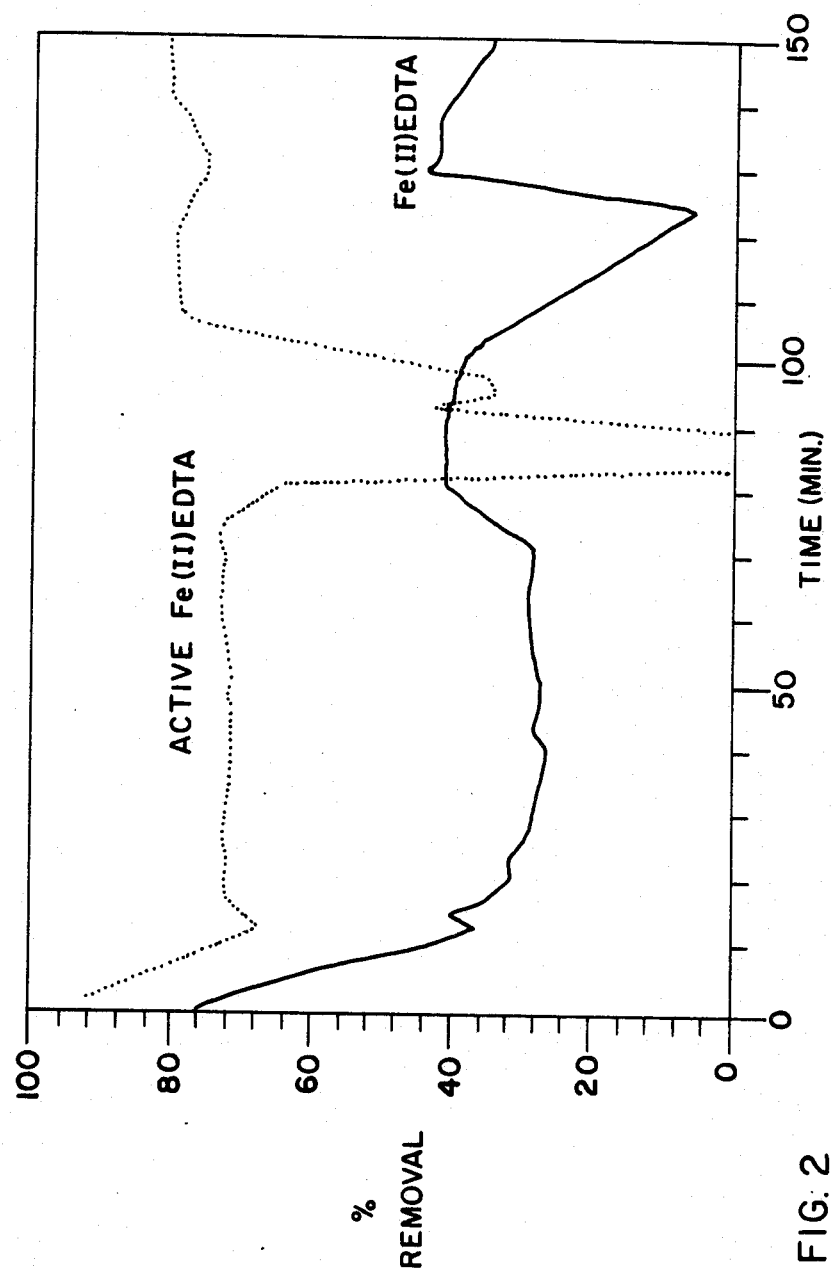
FIG. 2 compares the effect of active Fe(II)EDTA against Fe(II)EDTA on the removal of NO from an $O_2$-containing flue gas.

A solution of active Fe(II)EDTA was prepared by adding 89.79 gm of $Na_2H_2EDTA$ to 1500 ml of laboratory distilled deoxygenated water in a flask equipped with a Buchner funnel while stirring. Then 66.72 gms of $FeSO_4.7H_2O$ was added to 300 ml of laboratory distilled water in a beaker with stirring. The contents of the beaker was then poured into the flask while stirring. The mixture was then stirred overnight under a nitrogen blanket to allow complete coordination of the chelate to the metal ion. Total volume of the solution was increased to 3.6 liters and 1.12 gm moles of sodium carbonate was added to prepare a scrubber solution. A synthetic flue gas containing 5.1% oxygen as described previously was contacted with the solution for 150 minutes and monitored for NO removal. In a similar manner, a scrubber solution made with Fe(II)EDTA prepared by mixing the ferrous sulfate and EDTA in an oxygen environment and without a lengthy stirring was prepared and contacted with the oxygen-containing synthetic flue gas. The results are given in FIG. 2. As can be seen NO removal by the scrubber solution containing the active metal chelate is between 70 and 80% effective while the scrubber solution containing the nonactive Fe(II)EDTA prepared in the conventional manner, is at best able to remove no more than about 40% of the NO present in the gas stream.

EXAMPLE III

Active metal chelates of Zn(II)EDTA and Fe(II) hexamethylenetetraamine (Fe(II)HMTA) were prepared as described hereinbefore. Several scrubber solutions as previously described were made up from these active metal chelates and as for Fe(II)EDTA each contain 0.066 mole gm/l of the metal chelates. An additional solution was made up with Fe(II)EDTA to which was added citric acid and aluminum sulfate in a concentration of 0.066 gm moles/l.

Figure 3:
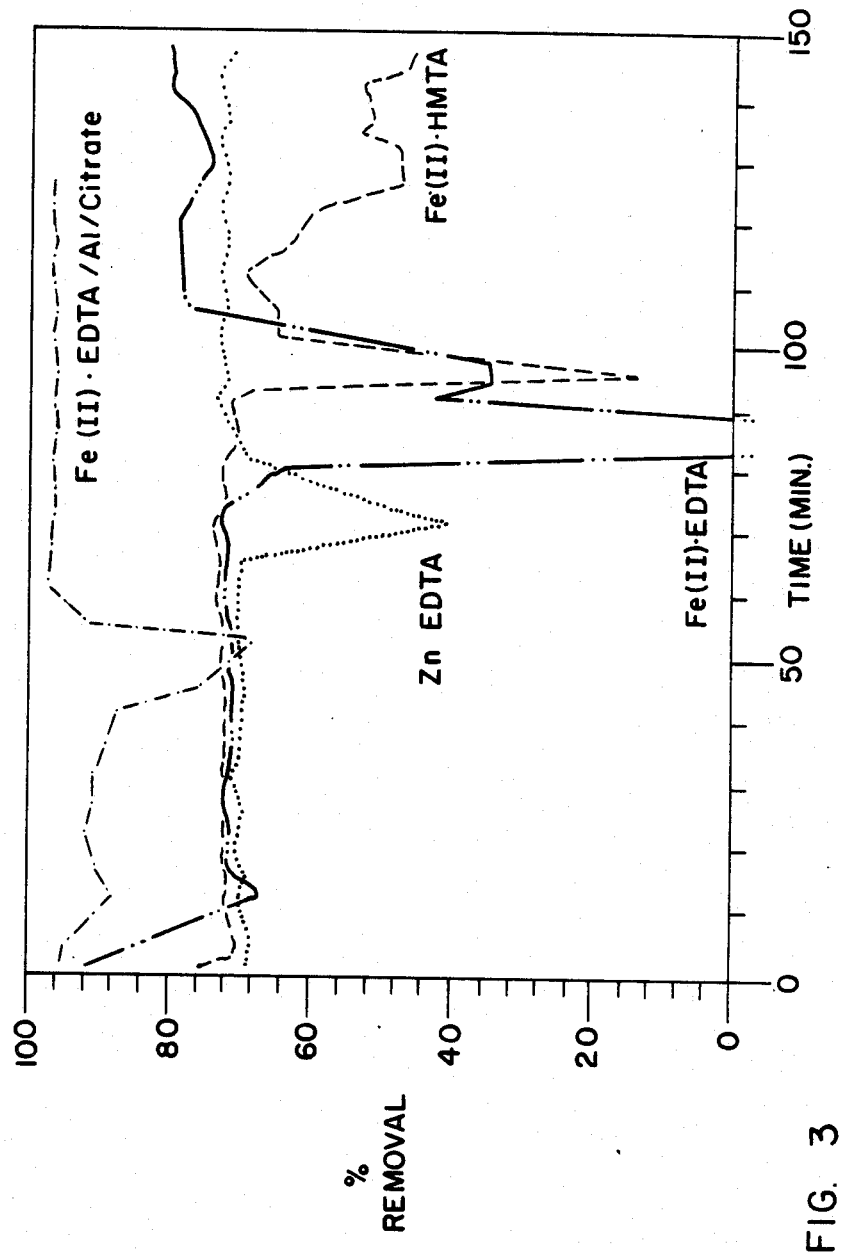
FIG. 3 compares the removal of NO from $O_2$-containing flue gas by various active metal chelates of the invention and with the addition of aluminum sulfate and citric acid.

Each of the solutions was contacted with the synthetic flue gas containing 5.1% oxygen as described previously. The results of the NO removal studies are shown in FIG. 3. As can be seen, the solutions containing the active metal chelates are equally effective for NO removal at about 70%. Note also that the addition of citric acid and aluminum sulfate increased the effectiveness to greater than 90%. The periods of decreased NO removal activity on each of the curves occured when the pH of the scrubber solution was not maintained within the range of 5 to 8 which resulted in the loss of an adequate $HSO_3^-$ ion concentration in the solution.

As can be readily seen from the preceding discussion and Examples, the method of the invention utilizing the active metal chelates, prepared as described herein, provides an effective method for the removal of a high percentage of NO in addition to the $SO_2$ already removed by the prior art method. Furthermore, the method of the invention is extremely effective when citric acid and aluminum ions are present with the active metal chelates, resulting in the removal of well over 90% of the NO present in the flue gas.

The method of the invention has the additional advantage over many other methods under consideration for NO removal in that it is totally compatable with flue gas scrubber systems presently in place for removing $SO_2$ in that the addition of the reagents to the solutions presently in use is all that is required to utilize the method.

The embodiments of this invention in which an exclusive property or privilege is claimed are defined as follows:

1. A method for removing $SO_2$ and NO from flue gas containing oxygen resulting from the combustion of carbonaceous material comprising:

preparing an aqueous scrubber solution containing an aqueous sulfur dioxide sorbent and an active metal chelate, the active metal chelate being prepared by mixing a metal ion as a soluble metal salt in an aqueous solution with a chelating agent in an oxygen-free environment for a period of time sufficient for all the possible coordination sites on the chelating agent to coordinate with the metal ion, thereby forming the active metal chelate, and contacting the oxygen-containing flue gas containing at least 1000 ppm $SO_2$ with the scrubber solution while maintaining the pH of the scrubber solution between 5 and 9, the $SO_2$ dissolving in the solution to form $HSO_3^-$, the NO dissolving in the solution to form $HNO_2$, the $HNO_2$ reacting with some of the $HSO_3^-$ to form hydroxylamine N-sulfonates, thereby removing $SO_2$ and NO from the flue gas.

2. The method of claim 1 wherein the aqueous sulfur dioxide sorbent is selected from the group consisting of sodium carbonate, calcium hydroxide, magnesium oxide and sodium bisulfite.

3. The method of claim 2 wherein the chelating agent is selected from the group consisting of polyamines, polyamino-polycarboxylic acids and polycarboxylic acids and the metal ion is selected from the group consisting of Fe(II), Zn(II), Ni(II), Ca(II), and Al(III).

4. The method of claim 3 wherein the chelating agent is selected from the group consisting of hexamethylenetetraamine, ethylenediamine, diethylenetriamine, triethylenetetraamine, ethylenediaminetetraacetic acid N-(2-hydroxyethyl)ethylenediamine-N, N',N'-triacetic acid and citric acid.

5. The method of claim 4 wherein the aqueous sulfur dioxide sorbent is present in a concentration of from about 0.05 to 1.5 gm moles per liter.

6. The method of claim 7 wherein the scrubber solution contains from about 0.05 to 0.7 gm moles per liter of active metal chelate.

7. The method of claim 6 wherein the flue gas contains at least 3000 ppm $SO_2$.

8. The method of claim 7 including the additional step of contacting the scrubber solution with a slurry of lime or limestone whereby the dissolved $SO_2$ reacts to form insoluble calcium compounds and the hydroxylamine N-sulfonates precipitate out on the surface of the solids thereby regenerating the scrubber solution, and recycling the scrubber solution.

9. The method of claim 8 wherein the active metal chelate is selected from the group consisting of Zn(II) ethylenediaminetetraacetic acid, Fe(II) hexamethylenetetra-amine, Fe(II) ethylenediaminetetraacetic acid and Al(III) citrate.

10. The method of claim 8 wherein the scrubber solution contains a second active metal chelating agent.

11. The method of claim 10 wherein the active metal chelate is selected from the group consisting of Zn(II) ethylenediaminetetraacetic acid, Fe(II) hexamethylenetetraamine and Fe(II) ethylenediaminetetraacetic acid and the second metal chelate is aluminum citrate.

12. In the method for removing $SO_2$ from flue gas containing oxygen and NO resulting from the combustion of carbonaceous material, wherein the flue gas is passed through an aqueous scrubber solution containing an aqueous sulfur dioxide sorbent which reacts with the sulfur dioxide to form a soluble sulfur compound, and the scrubber solution is contacted with a slurry containing a calcium compound which reacts with the soluble sulfur compound to form an insoluble sulfur precipitate thus regenerating the scrubbing solution which is then recycled, the improvement wherein the scrubber solution will simultaneously remove both $SO_2$ and NO from the flue gas comprising, adding an active metal chelating agent to the scrubber solution, the active metal chelating agent being prepared by mixing an appropriate quantity of a soluble metal salt with a soluble chelating agent in deoxygenated water under an oxygen-free environment for a period of time sufficient for all available sites on the chelating agent to coordinate with the metal ion, and maintaining the pH of the scrubber solution between 5 and 9, whereby $SO_2$ dissolves in the solution to form $HSO_3^-$, NO dissolves in the solution to form $HNO_2$ and the $NO_2$ reacts with some of the $HSO_3^-$ to from hydroxylamine N-sulfonates, thereby removing $SO_2$ and NO from the flue gas.

13. The method of claim 12 wherein the aqueous sulfur dioxide sorbent is selected from the group consisting of sodium carbonate, calcium hydroxide, magnesium oxide and sodium bisulfite.

14. The method of claim 13 wherein the chelating agent is selected from the group consisting of polyamines, polyamino-polycarboxylic acids and polycarboxylic acids, and the metal ion is selected from the group consisting of Fe(II), Zn(II), Ni(II), Co(II), and Al(III).

15. The method of claim 14 wherein the chelating agent is selected from the group consisting of hexamethylenetetraamine, ethylenediamine, diethylenetriamine, triethylenetetraamine, ethylenediaminetetraacetic acid, N-(2-hydroxyethyl)ethylenediamine-N, N', N'-triacetic acid and citric acid.

16. The method of claim 15 wherein the aqueous sulfur dioxide absorbent is present in concentrations of from about 0.05 to 1.5 gm moles per liter and the scrubber solution contains about 0.05 to 0.7 gm moles per liter of active metal chelate.

17. The method of claim 16 including the additional step of contacting the scrubber solution with a slurry of lime or limestone whereby the dissolved $SO_2$ reacts to form insoluble calcium compounds and the hydroxylamine N-sulfonates precipitate out on the surface of the solids thereby generating the scrubber solution, and recycling the scrubber solution.

18. The method of claim 17 wherein the active metal chelate is selected from the group consisting of Zn(II) ethylenediaminetetraacetic acid, Fe(II) hexamethylenetetraamine, Fe(II) ethylenediaminetetraacetic acid and Al(III) citrate.

19. The method of claim 17 wherein the scrubber solution contains a second active metal chelating agent.

20. The method of claim 19 wherein the active metal chelate is selected from the group consisting of Zn(II), ethylenediaminetetraacetic acid, Fe(II) hexamethylenetetraamine and Fe(II) ethylenediaminetetraacetic acid and the second metal is chelate aluminum citrate.

* * * * *